(12) United States Patent
Tsuboi

(10) Patent No.: US 8,353,057 B2
(45) Date of Patent: Jan. 8, 2013

(54) INFORMATION PROCESSING APPARATUS, CONTROL METHOD, AND CONTROL PROGRAM

(75) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 12/816,049

(22) Filed: Jun. 15, 2010

(65) Prior Publication Data
US 2010/0333214 A1 Dec. 30, 2010

(30) Foreign Application Priority Data

Jun. 29, 2009 (JP) ................................ 2009-153317

(51) Int. Cl.
*G06F 21/00* (2006.01)
(52) U.S. Cl. ................. 726/32; 726/27; 726/30; 726/33
(58) Field of Classification Search ............... 726/26–33
See application file for complete search history.

(56) References Cited

U.S. PATENT DOCUMENTS

| 2004/0019800 | A1* | 1/2004 | Tatebayashi et al. | ........ 713/200 |
| 2005/0220296 | A1* | 10/2005 | Kawell et al. | ................ 380/1 |
| 2006/0106727 | A1* | 5/2006 | Yellai et al. | ........................ 705/59 |
| 2009/0228982 | A1 | 9/2009 | Kobayashi | |

FOREIGN PATENT DOCUMENTS

JP 2006-107468 A 4/2006

OTHER PUBLICATIONS

Maña et al. "A framework for secure execution of software," International Journal of Information Security vol. 3, No. 2 (2004), pp. 99-112.*

* cited by examiner

*Primary Examiner* — Kambiz Zand
*Assistant Examiner* — Michael Guirguis
(74) *Attorney, Agent, or Firm* — Canon USA, Inc., IP Division

(57) ABSTRACT

An information processing apparatus in which an application managed by a license based on license data operates. The information processing apparatus includes a recording unit to record transfer information indicating that the license data is transferred from the information processing apparatus to a second information processing apparatus, and a prohibition unit to prohibit use in the information processing apparatus of the license data corresponding to the transfer information when the transfer information indicates that the license data has been transferred from the information processing apparatus to the second information processing apparatus.

9 Claims, 8 Drawing Sheets ns as those of the MFP 102 illustrated in FIG. 1. A scanner

INFORMATION PROCESSING APPARATUS, CONTROL METHOD, AND CONTROL PROGRAM

BACKGROUND OF THE INVENTION

1. Field of the Invention

The present invention relates to an information processing method in a license management system.

2. Description of the Related Art

An application license management system allows businesses and others to manage product licenses by enforcing, monitoring, and maintaining licenses to keep track of which customers have licensed what application and how those applications and licenses are being used. There is an apparatus that can be connected to a network to install an application with a license. There is a process by which a license issuing server transfers an application and a related license to another apparatus (for example, see Japanese Patent Application Laid-Open No. 2006-107468).

The license handled by Japanese Patent Application Laid-Open No. 2006-107468 activates an application that is preinstalled in a device. When the license is installed and when the license is transferred, since a license condition is stored in a non-volatile area, it is possible to prevent use of the license without proper authorization when the license is transferred.

SUMMARY OF THE INVENTION

According to an aspect of the present invention, an information processing apparatus in which an application managed by a license based on license data operates includes a recording unit to record transfer information indicating that the license data is transferred from the information processing apparatus to a second information processing apparatus. The information processing apparatus also includes a prohibition unit to prohibit use in the information processing apparatus of the license data corresponding to the transfer information when the transfer information indicates that the license data has been transferred from the information processing apparatus to the second information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The constitutive elements described in an exemplary embodiment of the present invention are merely exemplary. The scope of the present invention is not limited merely to such exemplary description within a scope that does not depart from the spirit of the present invention. A licensor may grant license to a licensee to authorize certain use of an application and use of that license. One aspect of the present exemplary embodiment enables prevention of use of a license without proper authorization when an application and the license are installed at the same time, and for example, reduces a recovery processing load when a hard disk drive (HDD) is exchanged.

Figure 1:
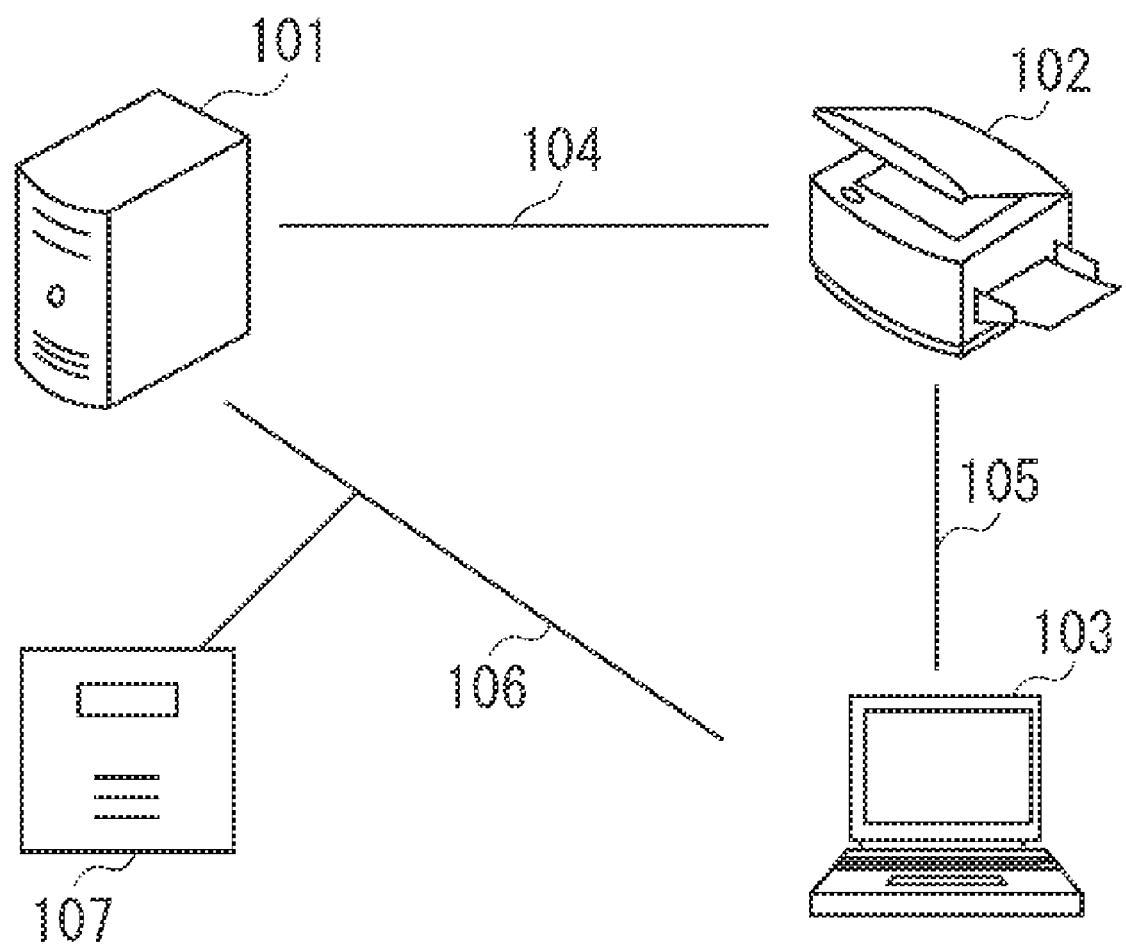
FIG. 1 illustrates a system configuration diagram according to an exemplary embodiment of the present invention.

FIG. 1 illustrates a network system configuration that includes an information processing apparatus according to an exemplary embodiment of the present invention.

In FIG. 1, a contents distribution server 101 is configured to distribute an application, a license, or firmware. A computer system provided in the contents distribution server 101 may constitute an example of a server access unit, a number request unit, an apparatus body number recognition unit, a contents distribution confirmation demand unit, an apparatus body number check unit, a contents distribution unit, an option information registration unit, an identifier generation unit, an identifier transmission unit, and the like. The contents distribution server 101 may be integrated with a license server apparatus 107.

A multifunction peripheral (MFP) 102 includes functions such as a printer, a scanner, a copier, a FAX, and the like in a single unit. A plurality of applications and licenses can be installed in the MFP 102 and each application and each license has a unique device identification (ID). The MFP 102 can install the firmware, applications, and licenses according to the present invention.

An information processing apparatus 103 is used to remotely operate the MFP 102. A network 104 includes the Internet or the like, and the MFP 102 can be connected with the contents distribution server 101 via the network 104. A network 105 also includes the Internet or the like, and the information processing apparatus 103 can be connected with the MFP 102 via the network 105. An example of a communication circuit 106 is illustrated in FIG. 1. Each apparatus in the network system configuration of FIG. 1 can communicate with one another directly or via another apparatus. When a license access number and an MFP identification ID to be installed are input from an input screen of the information processing apparatus 103 to the license server apparatus 107, a license file is generated and issued. An encryption key that corresponds to a decryption key in the MFP or the like encrypts the license file.

Figure 2:
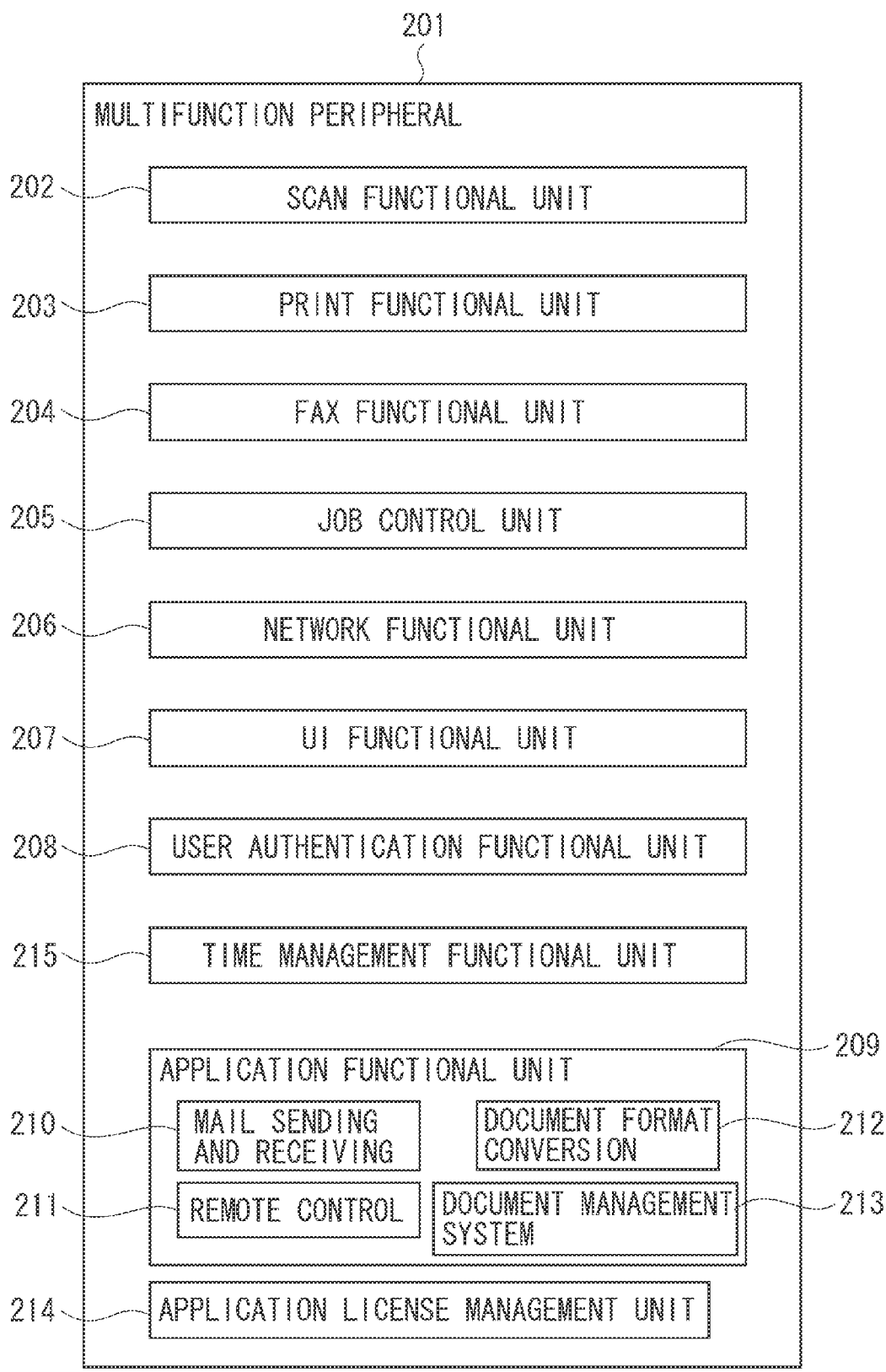
FIG. 2 illustrates a functional block diagram of a multifunction peripheral according to the exemplary embodiment of the present invention.

FIG. 2 illustrates a functional block diagram of an MFP according to the present exemplary embodiment.

An MFP 201 includes the same functions and configurations as those of the MFP 102 illustrated in FIG. 1. A scanner functional unit 202 is configured to read a paper document and convert a read result into binary image data. A print functional unit 203 is configured to add a command for a printer to the image that is read and converted into the binary image data by the scanner functional unit 202 and output the image to a printer device. A facsimile functional unit 204 is configured to encode the image that is read and converted into the binary image data by the scanner functional unit 202 according to a facsimile standard such as G3, G4, or the like. The facsimile functional unit 204 also is configured to perform image communication with an external facsimile apparatus using a protocol according to the facsimile standard. The facsimile functional unit 204 further is configured to transmit and receive a facsimile image to and from an external facsimile apparatus according to the facsimile standard.

A job control functional unit 205 queues pieces of the binary image data received from the scanner functional unit 202 and the facsimile image data received by the facsimile functional unit 205 from an external apparatus as print jobs. The job control functional unit 205 includes a job control function of executing suitable output in sequence to the print functional unit 203, the facsimile functional unit 204, and a network functional unit 206 described below. The network functional unit 206 includes various network protocol functions including a transmission control protocol/internet protocol (TCP/IP), a hypertext transfer protocol (HTTP), a file transfer protocol (FTP), a lightweight directory access protocol (LDAP), a simple network access protocol (SNMP), a simple mail transfer protocol (SMTP), a secure sockets layer (SSL), or the like. The MFP 201 can receive licenses and applications or execute transmission to an external personal computer (PC) by using the various network protocols.

A user interface (UI) functional unit 207 manages input and output by a user on an operation panel on the MFP 201, and displays an input field, an output message field, and the like on the operation panel. The UI functional unit 207 has functions of receiving a value input to the input field by the user, notifying other functional units of the input value, and displaying a message to the user from other functional units on a pre-designed screen. A user authentication functional unit 208 responds to a user authentication request for various applications in an application functional unit 209 with using the UI functional unit 207 or an information terminal (not illustrated) on the network. In other words, various user authentication functions are set for each application using a user authentication setting file. Further, the user authentication functional unit 208 has a function of authenticate the user who operates each function of the MFP 201 using user authentication information in the MFP 201 or a user authentication server on the network.

The application functional unit 209 includes functions of installing various applications operated on the MFP 201, authenticating a user, executing the applications, and uninstalling the applications. The application functional unit 209 further sets an expiration date for the application when the application is installed. When the application is executed, a time management functional unit 215 described below is used to determine the expiration date, which is pre-set when the application was installed, so that execution of the application with the expiration date can be realized.

For the setting for the application expiration date, expiration date information may be stored in an application object, or a separate object may be set as additional information to the application when the application is installed. The expiry date shows a number of days from installation of the application until the application will cease to operate. The expiry date may be a number of days indicating a validity period or may be an expiry day in a day/month/year format. When the expiry day indicates the expiry date, a system built-in clock in the MFP 201 may calculate the number of days indicating the validity period. More precise units than a number of days, for example of a number of seconds may be used. If such units fall within the scope of units used by the system built-in clock, they may be used for calculation of the expiry date. The expiry date is transferred as an argument to an installation time setting function described below when the application is installed, and is stored in a non-volatile storage region in the MFP 201. The expiry date may be set to an indefinite-period.

When a decoded valid license is installed, an application can be started up. When a valid license is not installed, the application cannot be started up. When a license file is decoded, an application ID and an expiry date are generated. An application license management unit 214 allows startup and operation of the application only after checking that the application ID corresponds to the ID of the application and confirming that the data in the license file is valid.

The application license management unit 214 in FIG. 2 manages a state of the installed license or the license for the application. The state of the license includes the expiry date, validity, invalidity, or the like. The application license management unit 214 also manages an ignored license ID, a transfer flag, and the like, and details thereof will be described below with reference to FIG. 4 and FIG. 7. The application license management unit 214 executes determination processing 402 and installation processing unit 406 in FIG. 4 and determination processing 702 and installation processing 706 in FIG. 6.

Among the applications of the MFP 102, functions of the application whose main body is already installed in the MFP 102 can be validated by installation of only a license key.

A validation sequence is required after installing the application to use the application on the MFP 102. Using the license key, which generally is input from the UI functional unit 207, validates the application. The license key is encrypted information including an identification ID for identifying a functional type of the license and a device in which the license is validated. Use of the network functional unit 206 may perform input of the license key via the network.

Inputting the license key into the MFP 102 executes the validation of the application. In practice, a license bit existing in the non-volatile storage region in the MFP 102 corresponding to each of the applications is turned ON. In the same manner, turning the license bit OFF invalidates the application. When the license bit of the system in the MFP 102 or the application itself is OFF, startup of the application is prevented. When the license bit is ON, startup of the application is permitted.

A mail sending and receiving application 210 is one of the applications of the MFP 201 operated on the application functional unit 209. The mail sending and receiving application 210 receives an email having an electronic document attached thereto sent from an information terminal (not illustrated) on the network by use of the network functional unit 206. The mail sending and receiving application 210 has a function of performing printing by use of the print functional unit 203. The mail sending and receiving application 210 further attaches an electronic document read using the scanner functional unit 202 to an email and transmits the email with the electronic document attached thereto to a preset transfer destination.

A remote control application 211 is one of the applications on the MFP 201 operated by the application functional unit 209. The remote control application 211 has a function of displaying the same interface as a main body's touch panel, which is displayed on the MFP main body using the UI functional unit 207 on an information terminal (not illustrated) on the network to thereby enable remote control.

A document format conversion application 212 is one of the applications on the MFP 201 operated by the application functional unit 209. The document format conversion application 212 has a function of converting electronic data into a preset electronic data format. Electronic data read by the user using the scanner functional unit 202 or electronic data sent from an information terminal on the network using the network functional unit 206 are subjected to the conversion.

A document management system application 213 is one of the applications on the MFP 201 operated by the application functional unit 209. The document management system application 213 has a function of storing data in a preset document storage location in the MFP main body or on the network. The stored data includes electronic data read by the user operating the scanner functional unit 202 or electronic data sent from an information terminal on the network using the network functional unit 206.

The mail sending and receiving application 210, the remote control application 211, the document format conversion application 212, and the document management system application 213 can execute user authentication. When using the application, the user utilizes the user authentication functional unit 208 via the application functional unit 209.

The time management functional unit 215 includes the system built-in clock and provides a system built-in clock interface that can be used for time setting and referred to for all functional modules of the MFP 201. The time management functional unit 215 has a function of storing cumulative setting differential time from the system startup time as described below in a non-volatile storage region of a flash read only memory (ROM) or the like. The time management functional unit 215 further has a function of adjusting the time according to a time synchronization service on the network to which the MFP 201 is connected. The time synchronization service is a service for synchronizing the time using a protocol specified by a TIME protocol (RFC868), a network time protocol (NTP) (RFC1305), a simple network time protocol (SNTP) (RFC 1769), or the like. The time management functional unit 215 further has a function of setting installation time, at the time of application installation as described below, to determine an expiry date of an application having an expiry date.

Figure 3:
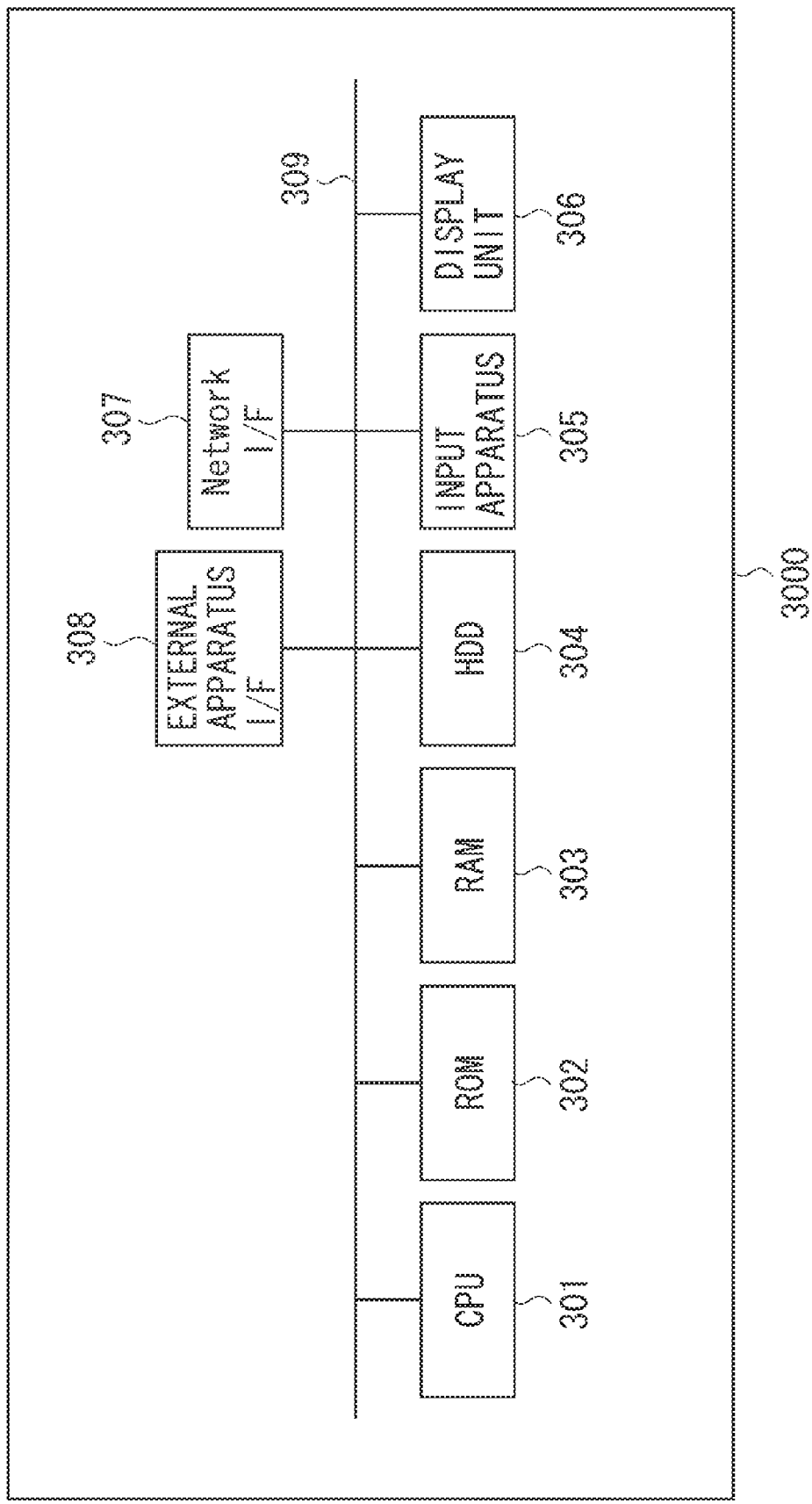
FIG. 3 illustrates a functional block diagram of a contents distribution server according to the exemplary embodiment of the present invention.

FIG. 3 illustrates a functional block diagram of a contents distribution server 3000. A central processing unit (CPU) 301 controls each processing in the apparatus. A read-only memory (ROM) 302 stores data or programs related to each processing of the apparatus and cannot be rewritten. A random access memory (RAM) 303 electrically stores temporary data related to each processing of the apparatus and can be rewritten. Temporary data or programs and data related to each processing of the apparatus are stored in a hard disk (HDD) 304. An input apparatus 305 includes a keyboard or a pointing device that receives an instruction input to the apparatus. A display unit 306 displays various pieces of information such as an operational state of the apparatus and outputs from each program operated by the apparatus. A network interface (I/F) 307 is connected to the Internet or a local area network (LAN) via the network to execute information exchange with external apparatuses. An external apparatus I/F 308 is connected to an external storage device or the like. The above units are connected by a system bus 309 and exchange data with each other.

Figure 4:
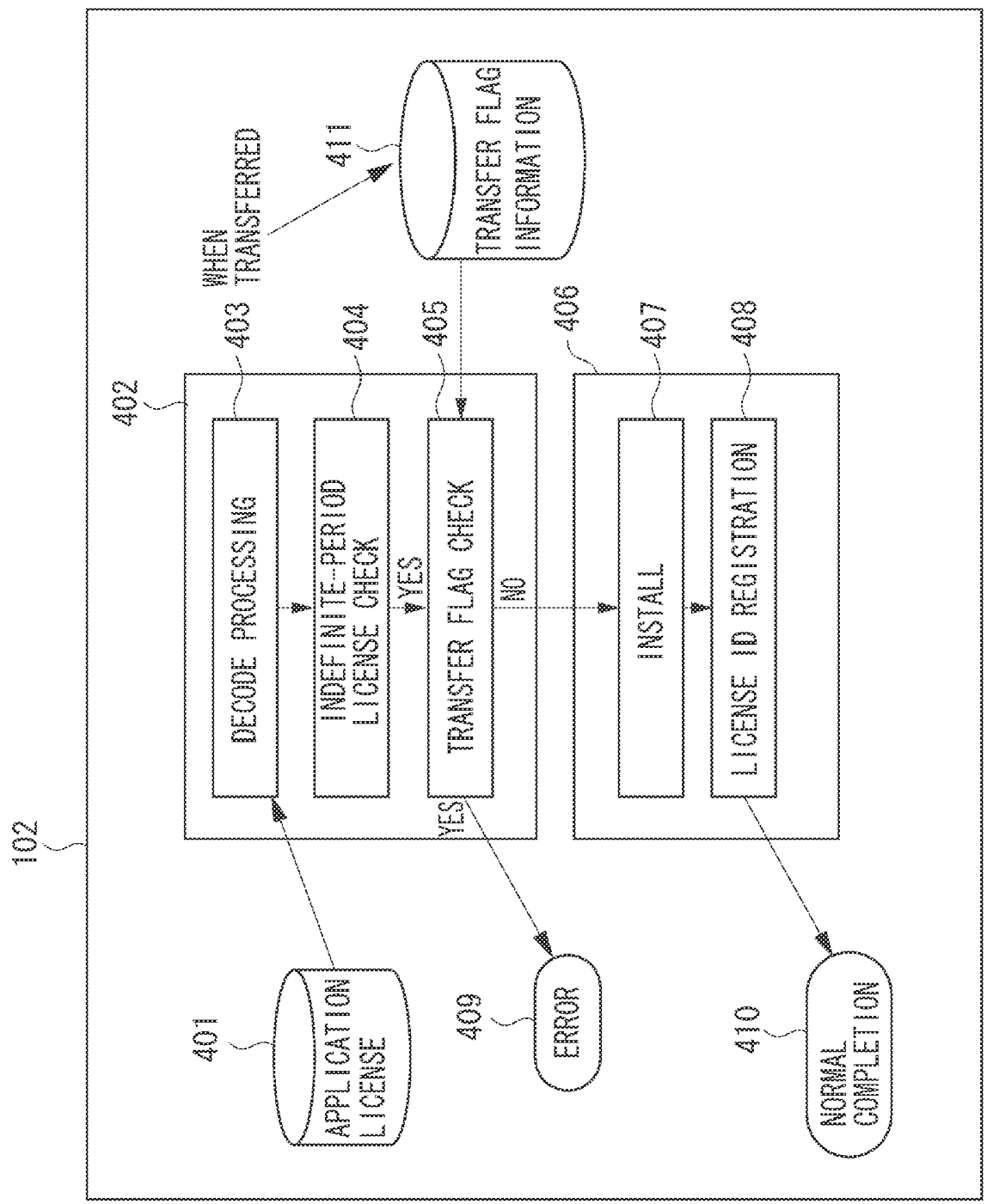
FIG. 4 illustrates a processing flow for installation of an indefinite-period license according to the exemplary embodiment of the present invention.
Figure 7:
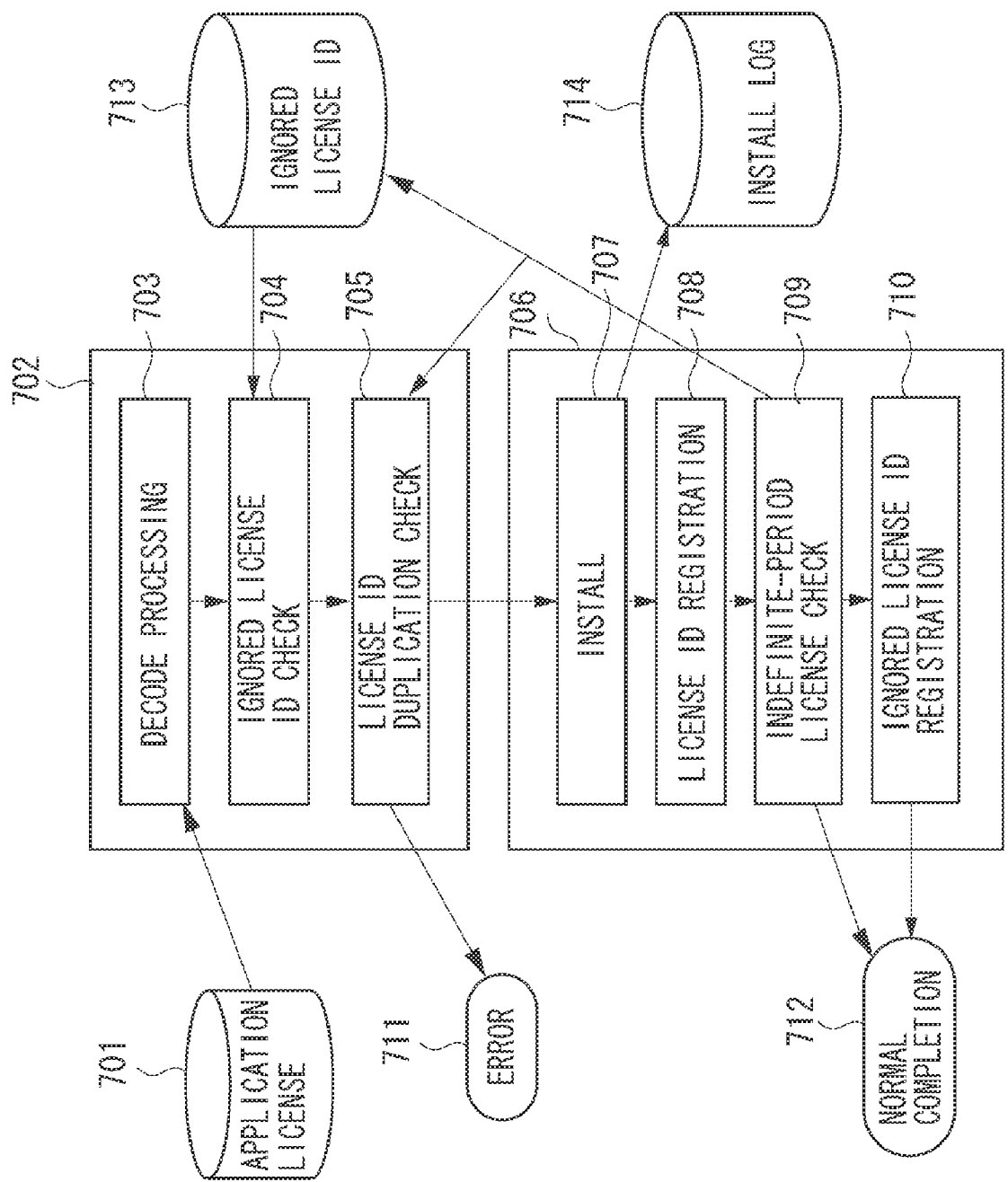
FIG. 7 illustrates a processing flow for installation of an indefinite-period license according to the exemplary embodiment of the present invention.

The MFP 102 includes approximately the same hardware as the contents distribution server 3000 in FIG. 3. However, the MFP 102 is different from the contents distribution server 3000 in that the MFP 102 is further provided with hardware and software for printing functions and image processing functions, and has limited CPU and memory resources. Software as illustrated in FIG. 4 and FIG. 7 is stored in the HDD 304 and executed by the CPU 301. Further, the CPU 301 executes the processing illustrated in FIG. 5.

The processing for installing a license according to the present exemplary embodiment will be in detail described below.

FIG. 4 illustrates an example of a software block in the MFP 102. Installation of the license is realized by executing the determination processing 402 and the installation processing unit 406 in FIG. 4 and the application license management unit 214 in FIG. 2. Program codes that configure respective processing procedures implement each processing illustrated in FIG. 4. Application license 401 in FIG. 4 is data configuring an application and a license to be installed. The determination processing 402 determines whether installation can be executed in the MFP 102. MFP 102 executes the installation processing unit 406.

When installation of the application license 401 is requested in the MFP 102, a decoding processing unit 403 executes decoding thereof. Then, an indefinite-period license check unit 404 checks whether the application license 401 is an indefinite-period license. For example, a determination unit may determine whether an expiry date of license data has an indefinite period When the application license 401 is an indefinite-period license, a transfer flag check unit 405 executes a transfer flag check. When a transfer flag is ON, an error management unit 409 displays an error in an operation unit of the MFP 102. Alternatively, an error notification is executed via the network to a PC that is an installation destination. In this case, the application is not installed. When the transfer flag is OFF, an installation unit 407 executes installation.

Transfer flag information 411 used for checking in the transfer flag check unit 405 is written into when the license is transferred. In other words, the transfer flag information 411 stores whether the license has been transferred to an external apparatus. After installation, a license ID registration unit 408 executes registration of the license ID. Then, installation is completed in procedure 410.

The transfer flag is associated with the license ID for identifying the license file and recorded. For example, when the transfer flag has a value of 1, the value of 1 conveys that the license file corresponding to the license ID has been transferred to an external apparatus. When the transfer flag has a value of 0, the value of 0 conveys that the license file has not been transferred to an external apparatus.

Figure 5:
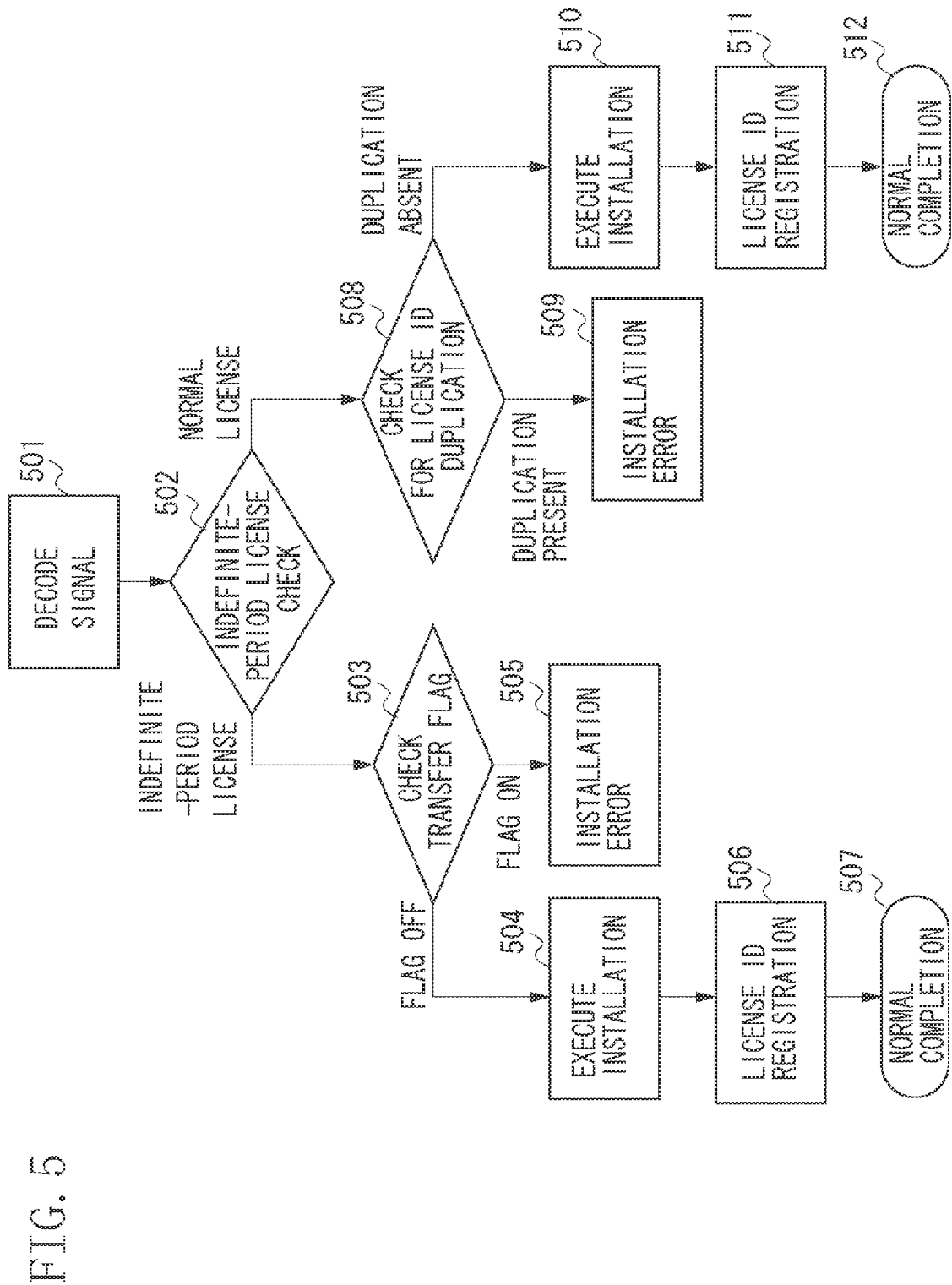
FIG. 5 is a flowchart illustrating installation according to the exemplary embodiment of the present invention.

FIG. 5 is a flowchart illustrating an example of normal installation of a license.

The application license management unit 214 illustrated in FIG. 2 executes the processing illustrated in FIG. 5. In step S501, decoding of the license is executed, and in step S502, an indefinite-period license check is executed. If it is determined in step S502 that the license has an indefinite period, then a transfer flag check is executed in step S503. When the application license management unit 214 determines at step S503 that a transfer flag 405 is ON, then it is determined in step S505 as an installation error and installation is not executed. When the application license management unit 214 determines at step S503 that a transfer flag 405 is OFF, then installation is executed in step S504. Then, in step S506, registration of the license ID is executed and, in step S507, installation processing is completed.

If it is determined in step S502 that the license is a normal license, the application license management unit 214 executes in step 508 a license duplication check. When duplication is detected (duplication present), then in step S509, it is determined as an installation error. When no duplication of the license ID is detected (duplication absent), then in step S510, installation of the license is executed. Then, in step S511, registration of the license ID is executed and in step S512, the installation processing for the license is completed. Installation of the license may be executed together with installation of the application. When the license is not installed, installation of the application also may be suppressed.

In other words, when the transfer flag is ON in the transfer flag 405, installation of the license is not permitted and when the transfer flag is OFF, installation of the license is permitted.

The information processing apparatus 103 executes transfer processing of the license file from the MFP 102 to other MFPs. More specifically, such processing is executed as described below.

The information processing apparatus 103 accesses the MFP 102 via a browser. An application or license ID in the MFP 102 to be invalidated is designated via the browser. In this manner, license ID corresponding to the designated application or a license linked to the license ID corresponding to the designated license in the MFP 102 are invalidated and an invalidation license key is generated.

The invalidation license key is transferred from the MFP 102 to the information processing apparatus 103. A user uses the browser in the information processing apparatus 103 to store the invalidation license key in the information processing apparatus 103. Then, the user accesses the license server 107 using the browser in the information processing apparatus 103. The user then inputs the invalidation license key and an MFP identification ID for the license to be used via the browser. The browser transmits input information to the license server 107.

The license server 107 generates a license file that can only be used with the relevant MFP based on the invalidation license key and the MFP identification ID. The license file is transmitted from the license server 107 to the information processing apparatus 103. The license server 107 issues a new license file ID, which is stored in the license file.

Since a new license ID is generated each time an invalidated license is validated, installation is executed based on the new license file ID. Thus, installation prohibition by the transfer flag does not occur.

However, rather than issuing a new license file ID, there is a case where the license and the license ID invalidated in the MFP 102 may be issued again. In this case, a license file, which was extracted from the MFP 102 and used in another MFP, is invalidated, and the following procedure is executed when the license file is extracted again. When installation processing is attempted even if there is a valid license file, the transfer flag that has already been written will prohibit the installation process. In this case, the processing illustrated in FIG. 5 is modified by adding the following processing.

Figure 8:
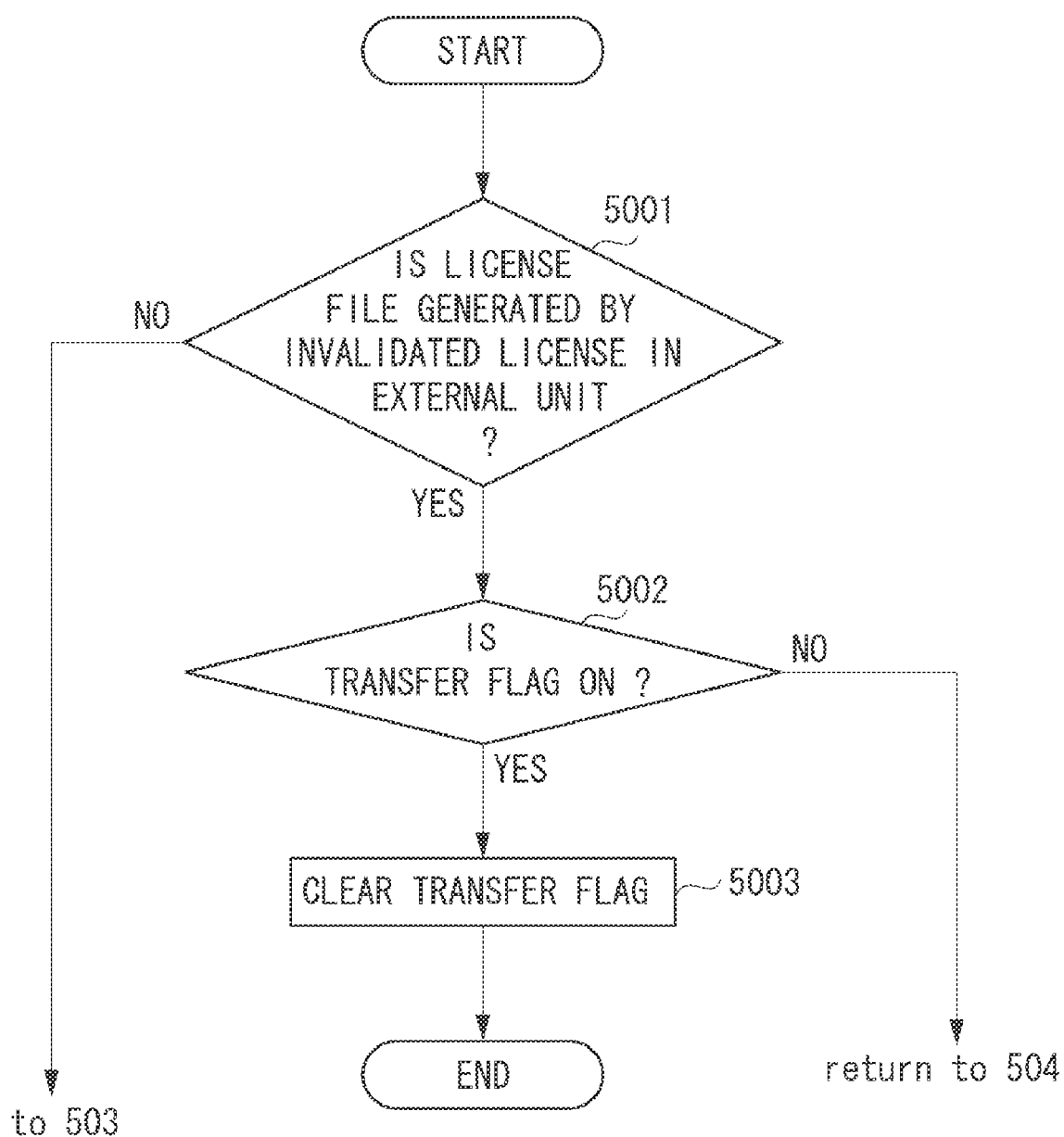
FIG. 8 illustrates a modified example of a part of the exemplary embodiment illustrated in FIG. 5.

FIG. 8 illustrates a modified example of an exemplary embodiment of the present invention. Similar to the processing in FIG. 5, the application license management unit 214 illustrated in FIG. 2 executes the processing illustrated in FIG. 8.

In step S502, if it is determined that the license has an indefinite period, the processing in FIG. 8 is started prior to checking the transfer flag at step S503. In step S5001, it is determined whether the license file includes a license invalidated by an external apparatus of the MFP. When it is determined that the license file includes the license invalidated by the external apparatus (YES in step S5001), then in step S5002, it is determined whether the transfer flag corresponding to the license ID of the license file is ON. When the license flag is ON (YES in step S5002), the processing proceeds to step S5003 and the transfer flag is cleared. By way of comparison, the license flag being ON at step S503 in the process of FIG. 5 resulted in an installation error at step S505 with installation not being executed. When the license flag is OFF (NO in step S5002), the processing returns to step S504 in FIG. 5.

In step S5001, if it is determined that the license file does not include the license invalidated by the external apparatus (NO in step S5001), the processing returns to step S503 in FIG. 5. The processing illustrated in FIG. 8 is executed in the following case. More specifically, the license file is once transferred from the MFP 102 to another external MFP or the like and validated by the external MFP. Then, the license is invalidated again in the external apparatus MFP. When the license is attempted to re-install in the MFP 102, the processing in FIG. 8 is executed.

According to the present exemplary embodiment, even when a license is output to an external apparatus on one occasion and used, the license can be installed again. It is assumed that a use amount for the license can be defined and a right of use for printing 100 pages is transferred to the external MFP. Then, when the right of use for 30 pages remains in the external apparatus MFP, the license file can be acquired by invalidating the 30 pages. At this time, when the external MFP recognizes that the license file is invalidated its license in the MFP 102 and transferred based on data stored in the license file, the external MFP records data indicating that invalidation has been executed in the external MFP in the license file. Using this data in step S5001, it is determined whether the right of use remaining in the external MFP, which is an apparatus other than the MFP, is a license file that is invalidated and generated.

Figure 6:
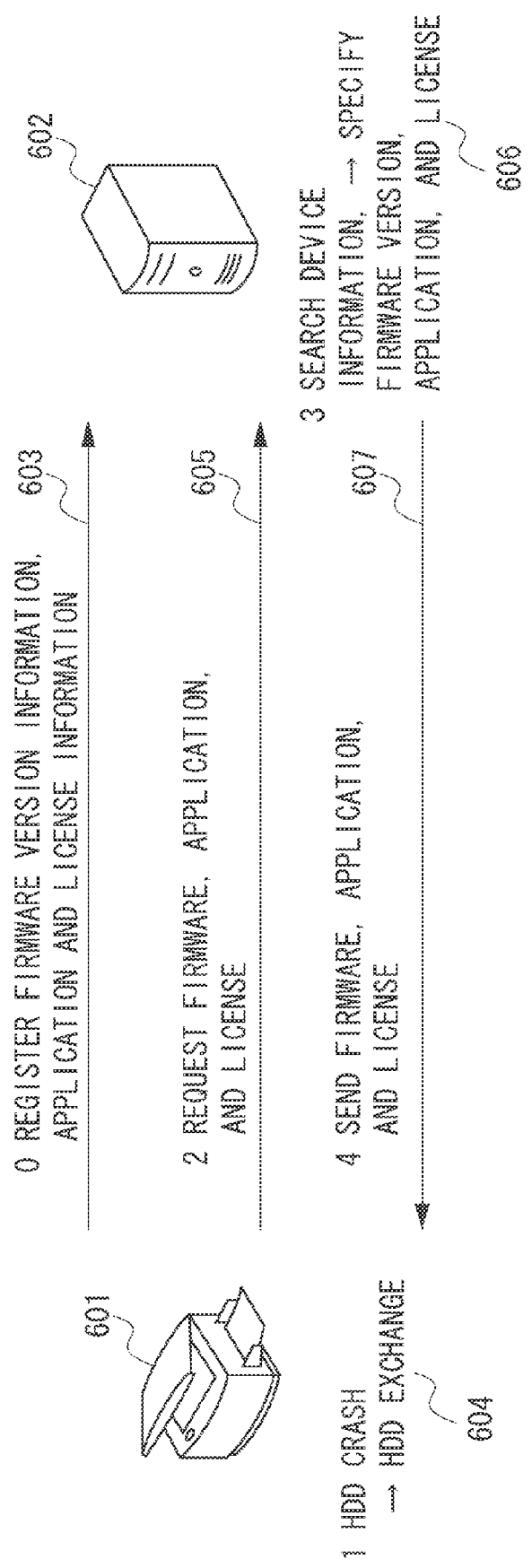
FIG. 6 illustrates a recovery flow during a hard disk (HDD) crash according to the exemplary embodiment of the present invention.

FIG. 6 illustrates a method for recovering firmware, an application, and a license when the HDD is exchanged. An MFP 601 is equivalent to the MFP 102. A contents distribution server 602 is equivalent to the contents distribution server 101.

Firstly, in procedure 603, firmware version information, an application, and license information are transmitted in advance from the MFP 601 to the contents distribution server 602.

When the HDD is exchanged in procedure 604, for example, after the HDD crash has occurred, a request for firmware, an application, and a license is made in procedure 605. In procedure 606, a search for registered information about the MFP 601 is conducted of information registered in the contents distribution server 602, and the firmware version, application, and license are identified. In procedure 607, the firmware, application, and license are transmitted to the MFP 601.

Application license 701 in FIG. 7 is an application and a license to be installed. Determination processing 702 determines whether installation can be executed in the MFP 102. The MFP 102 executes installation processing 706.

When the application license 701 is installed in the MFP 102, a decoding processing unit 703 executes decoding thereof. Then, an ignored license ID check unit 704 executes an ignored license ID check. The ignored license ID is registered in an ignored license ID storage unit 713 when an indefinite-period license is installed. A license ID duplication check is not performed in relation to license file IDs, which are registered in the ignored license ID storage unit 713. The license file ID is information for discriminating a license file storing a license key. When an indefinite-period license is transferred from the MFP 102 to an external PC, the ignored license ID registered in the ignored license ID storage unit 713 is deleted.

When the ignored license check unit 704 determines that the ignored license ID is present in the ignored license ID storage unit 713, a check of an installation history of the relevant license ID is skipped and the processing proceeds to installation processing by an installation processing unit 707. When the ignored license check unit 704 determines that the ignored license ID is not present in the ignored license ID storage unit 713, a license ID duplication check unit 705 executes a license ID duplication check. When it is determined that duplication of the license ID is present, an error is displayed in procedure 711. When the license ID duplication check unit 705 determines that there is no duplication of the license ID, the processing proceeds to the installation processing by the installation processing unit 707. The installation processing unit 707 writes an install log into an install log storage unit 714.

Then, the processing proceeds to a license ID registration unit 708. Then, an indefinite-period license check unit 709 executes an indefinite-period license check. When the license is the indefinite-period license, the ignored license ID is registered in the ignored license ID storage unit 713. Then, an ignored license ID registration unit 710 executes registration of the ignored license ID registration and thereby completes the installation in procedure 712. When the indefinite-period license check unit 709 determines that the license is not the indefinite-period license, the installation is completed at that point in procedure 712.

As described above, the MFP 102 has been described as an example of an information processing apparatus operating by an application whose license is managed based on a license file that is an example of license data.

The application license management unit 214 is an example of a recording unit that records under control of the CPU. A transfer flag is an example of transfer information indicating that license data has been transferred from the MFP 102 to the contents distribution server 101 or the information processing apparatus 103. When the transfer flag indicates that the license data has been transferred from the MFP 102 to the contents distribution server 101 or the information processing apparatus 103, that is to say, when the transfer flag is ON, the following processing is executed. More specifically, an error is transmitted to a license installation source and the installation of the license is stopped. In this manner, use of the license data corresponding to the transfer flag can be prohibited in the MFP 102.

According to the transfer of the license from the MFP 102 to the contents distribution server 101 or the information processing apparatus 103, transfer information indicating that the license has been transferred from the MFP 102 to another apparatus may be stored in the application license management unit 214.

The application license management unit 214 determines whether the expiry date of the license file has an indefinite period. The application license management unit 214 may include a prohibition unit to execute prohibition processing or deterrence processing when it is determined that the expiry date of the license data has the indefinite period.

When the license is invalidated in another information processing apparatus and license data is generated, the application license management unit 214 may include a changing unit to change a state of the recorded transfer flag to indicate that license data has not been transferred to another information processing apparatus. More specifically, the transfer flag may be cleared. The present exemplary embodiment can be implemented by designing the values 0 and 1 of the transfer flag to be reversed. In addition, the present exemplary embodiment can be implemented when an equivalent design is performed using another technical concept.

The software blocks and the control program that realize the processing according to the present exemplary embodiment may be distributed and stored in a computer-readable medium such as a digital versatile disk (DVD), a compact disk ROM (CD-ROM), and other medium capable of storing data in a machine-readable format that can be accessed by an automated sensing device. Further, the control program may be transmitted using a network and may cause an information processing apparatus to perform a method to control the information processing apparatus in which an application managed by a license based on license data operates.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-153317 filed Jun. 29, 2009, which is hereby incorporated by reference herein in its entirety.

What is claimed is:

1. An information processing apparatus in which an application managed by a license based on license data is configured to operate, the information processing apparatus comprising:
    a recording unit configured to record transfer information indicating that the license data is transferred from the information processing apparatus to a second information processing apparatus; and
    a prohibition unit configured to prohibit, in response to the transfer information indicating that the license data has been transferred from the information processing apparatus to the second information processing apparatus, use in the information processing apparatus of the license data corresponding to the transfer information,
    wherein, in response to the transfer information indicating that the license data has not been transferred from the information processing apparatus, the license data is used in the information processing apparatus, and
    wherein the recording unit and the prohibition unit are implemented by a central processing unit in the information processing apparatus.

2. The information processing apparatus according to claim 1, wherein the recording unit is configured to record transfer information indicating that the license is transferred from the information processing apparatus to the second information processing apparatus in response to the transfer of the license from the information processing apparatus to the second information processing apparatus.

3. The information processing apparatus according to claim 1, further comprising a determination unit configured to determine whether an expiry date of the license data has an indefinite period,
    wherein the prohibition unit is configured to execute prohibition processing in response to the determination unit determining that the expiry date of the license data has the indefinite period.

4. The information processing apparatus according to claim 1, further comprising a changing unit configured to change the transfer information recorded by the recording unit to a state that does not indicate that the license data is transferred from the information processing apparatus to the second information processing apparatus, in response to generating the license data by invalidating the license in the second information processing apparatus.

5. A method for controlling an information processing apparatus in which an application managed by a license based on license data is configured to operate, the method comprising:
  recording transfer information indicating that the license data is transferred from the information processing apparatus to a second information processing apparatus; and
  prohibiting, in response to the transfer information indicating that the license data has been transferred from the information processing apparatus to the second information processing apparatus, use in the information processing apparatus of the license data corresponding to the transfer information,
  wherein, in response to the transfer information indicating that the license data has not been transferred from the information processing apparatus, the license data is used in the information processing apparatus.

6. The method according to claim 5, wherein recording includes recording transfer information indicating that the license is transferred from the information processing apparatus to the second information processing apparatus in response to the transfer of the license from the information processing apparatus to the second information processing apparatus.

7. The method according to claim 5, further comprising determining whether an expiry date of the license data has an indefinite period
  wherein prohibiting includes executing prohibition processing in response to determining that the expiry date of the license data has the indefinite period.

8. The method according to claim 5, further comprising changing the recorded transfer information to a state that does not indicate that the license data is transferred from the information processing apparatus to the second information processing apparatus, in response to generating the license data by invalidating the license in the second information processing apparatus.

9. A non-transitory computer-readable medium storing a control program causing an information processing apparatus to perform the method according to claim 5.

* * * * *